United States Patent Office 2,992,705
Patented July 18, 1961

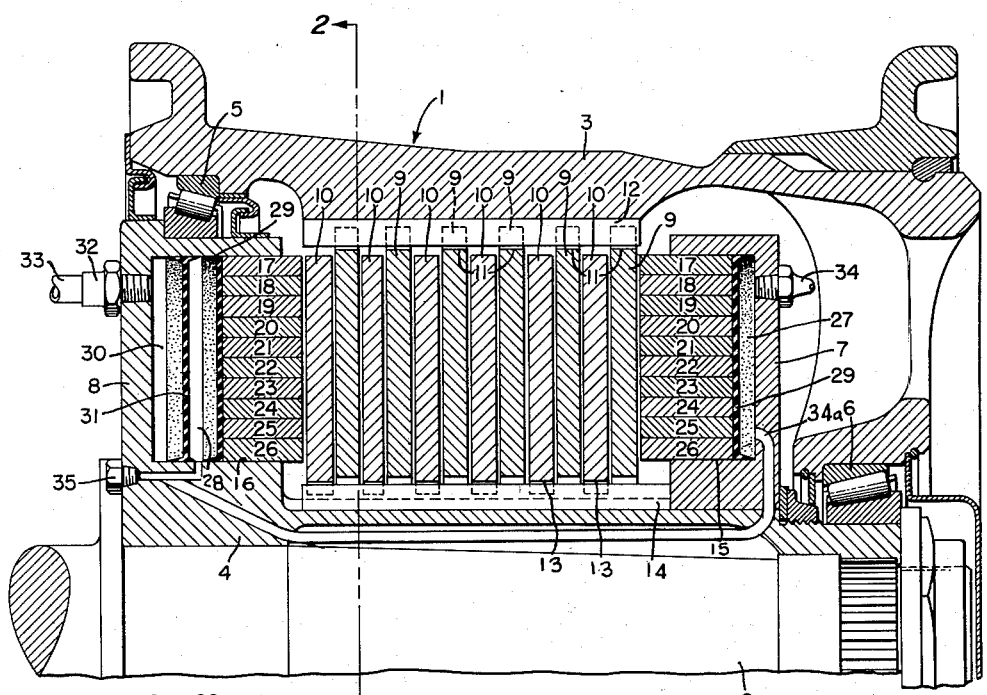

2,992,705
BRAKE WITH DEFLECTION COMPENSATING PISTONS
Doyle A. Chisnell, Doylestown, and Edgar A. Hirzel, Cuyahoga Falls, Ohio, assignors to The Goodyear Tire & Rubber Company, Akron, Ohio, a corporation of Ohio
Filed June 12, 1959, Ser. No. 819,860
4 Claims. (Cl. 188—72)

The present invention relates to brakes, especially to brakes having a set of stacked brake discs therein for braking action and wherein a plurality of annular, individually movable pistons are provided for engaging the brake discs for braking action.

In various types of brakes, and especially in brakes utilizing an axially movable set of stacked brake discs therein, frequently some of such brake discs are worn unevenly, or are warped out of a true flat or planar shape. In brakes of this type, usually alternate brake discs are secured to the wheel and to the axle and with the individual brake discs being axially movable into compressed relationship with each other for braking action. After extended periods of use, frequently many of such discs become worn unevenly, or they may be distorted slightly out of a true flat condition. Hence it is difficult to obtain efficient braking action by the stacks of brake discs by conventional brake means after appreciable use thereof. In brake discs of the foregoing type, it is the end brake discs that are particularly subject to uneven wear, or distortion after long periods of use.

It is the general object of the present invention to provide a novel and improved brake structure characterized by the use of a plurality of annular, concentric, individually movable brake pistons which can be moved axially different distances as required to obtain effective pressure engagement with large areas of end members of a stack of brake discs for effecting braking action thereon.

Another object of the invention is to provide a disc type brake with means so that wear adjustment is accomplished with a minimum of moving parts and so that wear equalizes itself around the brake surfaces.

Another object of the invention is to provide a set of concentric, annular pistons adjacent each margin of a stack of aligned annular brake discs and to use resilient pressure applying members at the axially outer ends of the sets of pistons to move them different distances into effective pressure engagement with the stack of brake discs.

Another object of the invention is to provide an improved brake construction particularly adapted for obtaining maximum efficiency braking action and at least a substantially uniform work distribution on a stack of brake discs of originally planar form.

A further object of the invention is to provide, in a brake of the class described, a flexible pressure chamber adjacent the axially outer ends of each of the set of annular pistons provided in the brake, and to provide a brake operating pressure liquid to at least one of such resilient liquid receiving chambers for effecting axial movement of the individual annular pistons in said sets of pistons for compression braking action on the stack of brake discs received therebetween.

Yet another object of the invention is to provide a brake of the class described where braking pressures can conveniently be supplied at reduced pressure from the brake operating system to the individual brake fluid receiving and actuating chambers of the brake.

The foregoing and other objects and advantages of the invention will be made more apparent as the specification proceeds.

For a better understanding of the present invention, attention particularly is directed to the accompanying drawings, where:

FIG. 1 is a vertical section of a brake embodying the principles of the invention;

FIG. 2 is a fragmentary section taken on line 2—2 of FIG. 1; and

FIG. 3 is a fragmentary section of a modified brake construction.

When referring to corresponding members shown in the drawings and referred to in the specification, corresponding numerals are used to facilitate comparison therebetween.

The brake construction of the invention generally relates to a brake having a housing with a face plate and a back plate or equivalent members therein and a stack of annular brake discs positioned between such plates and axially movable in the brake, and the invention covers the improvement comprising a set of annular pistons positioned in concentric relation to each other and individually movable parallel to the axis of the stack of brake discs in each of the face plate and the back plate, which sets of pistons are immediately adjacent opposite ends of the stack of brake discs and are movable into engagement with end members of the stack of brake discs, means forming brake fluid receiving chambers at the axially outer ends of each of the sets of pistons, and means supplying brake operating pressure fluid are connected to at least one of the brake fluid receiving chambers so that the annular pistons of one set of pistons and the brake discs can be moved axially in the brake to provide compression of the stack of brake discs to exert braking pressures thereon.

Attention now is particularly directed to the details of the construction shown in the drawing, and a brake of the invention is referred to as a whole by the numeral 1. Such brake 1 is shown in association with an axle 2 on which a wheel 3 is operatively positioned. The wheel 3 is shown positioned on the axle 2 by a brake housing indicated as a whole by the numeral 4. Suitable bearings 5 and 6 operatively journal the wheel 3 on the axle 2 through the brake housing 4, as indicated in FIG. 1. The housing 4 is shown as comprising a back plate 7 and a front plate or section 8 that are suitably assembled in engagement with each other to provide the brake positioning means of the invention.

Actual braking action in the brake 1 is provided by a stack or plurality of aligned, annular, axially movable brake discs 9 and 10. These brake discs 9 and 10 are alternately positioned in aligned, or stacked relationship with each other and with the brake discs 9 having longer radial length than the brake discs 10. The brake discs 9 have slots 11 at circumferentially spaced portions thereof for engaging keys 12, or equivalent members, to secure such brake discs 9 to the wheel 3 for rotation therewith. Similarly, radially inwardly extending sections are provided on the brake discs 10 and they have slots 13 therein for engaging keys 14, or equivalent members, secured to the brake housing 4 in the front plate 8 section thereof to be stationarily positioned thereby. Hence these alternately stacked brake discs, which can be of any conventional construction and composition, can have braking forces set up therein by axial compressive forces exerted on the end members of the stack of brake discs.

As features of the brake 1 of the invention, both the back plate 7 and the front plate 8 have annular recesses 15 and 16, respectively, provided in the axially inner surfaces thereof, and a set of annular, telescoped or nested, concentric pistons 17 through 26 is received in each of these annular recesses 15 and 16. These annular pistons 17 through 26, which all are of equal axial length but of different diameters, are axially movable in the recesses 15 and 16 and are movable with relation to each other. The drawing clearly shows that the effective radial length of the stack of annular pistons in each of the recesses 15 and 16 is substantially equal to the radial length of the brake discs 9 and 10. By making the annular pistons 17 through 26 movable with relation to each other, they can be moved axially varying distances in the brake 1 to be brought into effective frictional and braking engagement with end members of the set or stack of brake discs 9 and 10 for exerting compressive forces thereon to set up maximum braking action even though some of the brake discs 9 and 10, and particularly the end members thereof, may have been distorted or warped, or worn varying amounts at different radial portions thereof. Likewise, the individually movable annular pistons of the invention compensate for deflections of the front or back plates 7 and 8 and thus further aid in obtaining uniform braking actions at all times.

Sealed fluid pressure receiving chambers 27 and 28 are provided in the recesses 15 and 16, respectively, in the back plate and front plate by suitable means, such as resilient gaskets 29, FIG. 1. These gaskets 29 are made from any suitable resilient material. The gaskets 29 are of generally U-shaped in section and extend radially of the recesses 15 and 16 in which they are received with arm or leg portions extending therefrom axially outwardly of the sets of annular pistons. The gaskets are in contact with the axially outer ends of the annular pistons 17 through 26 and will remain in sealed engagement therewith even though different pistons move different distances.

As another feature of the present invention, a second fluid pressure receiving chamber or compartment 30 is provided in the front plate 8 of the brake housing by means of a second sealing gasket 31 received therein. Such gasket 31 is positioned in the axially outer end of the recess 16 in the front plate 8 and it is positioned in sealed engagement with the chamber 28.

FIG. 1 of the drawing best brings out that a suitable fitting 32 is secured to the front plate 8 in the brake and connects to a line 33 that in turn connects to suitable pressure cylinders or equivalent means by which a hydraulic braking fluid is supplied, under pressure, to the brake 1 of the invention.

Any desired types of fittings 34a and 35 operatively connect to the fluid receiving chambers 27 and 28 in the brake 1 for supplying viscous pressure fluid thereto, and a plugged outlet 34 is provided for bleeding air or fluid therefrom, as desired, so that the fluid pressure receiving chambers 27 and 28 can be continually filled with desired quantities of pressure transmitting liquid. In all events, when pressure is applied to the resilient gasket 29 forming the fluid pressure receiving chamber 28 in the front plate, such pressure will force the pistons 17 through 26 received in the recess 16 axially inwardly towards the stack of brake discs 9 and 10. Such brake discs will be moved over into contact with the annular pistons 17 through 26 positioned in the recess 15 in the back plate 7 and be compressed thereagainst. The annular pistons in both of the front and back plates in the brake will move whatever axial distances are required in order to bring them into effective compression engagement with the surfaces of the end members of the stack of brake discs, and with any distorted or worn portions thereof so that effective pressure engagement is secured with the brake discs over substantially the entire radial areas thereof. Hence a more uniform pressure distribution is provided on the brake disc faces and wear occurring in the brake discs is automatically compensated for by the brake construction of the invention. Additional fluid can be supplied to the fluid receiving chambers 27 and 28 as wear occurs through the fittings 34 and 35 to avoid any increased axial movement of the pistons 17 through 26.

It should be realized that in the brake 1 of the invention, the second sealing gasket 31 and the chamber 30 formed thereby can be eliminated and pressure can be directly supplied to the fluid receiving compartment 28. It also is within the concept of the invention to provide brake pressure liquid directly to both of the fluid receiving chambers 27 and 28, when desired.

FIG. 3 shows a modified construction where a brake housing front plate 8a has a set of annular, nested pistons 17a, 18a, 19a etc. received in a recess 16a therein. A gasket 29a seals against the axially outer ends of the pistons and forms a fluid pressure chamber 28a. A recess 116 of reduced radial length is formed at the axially outer end of the recess 16a and it slidably receives a gasket 31a therein. The gasket 31a and recess 116 form a brake pressure receiving chamber 30a that has brake operating pressure liquid supplied thereto by a conduit 33a. The reduced area of the gaskets 31a in relation to the area of the gasket 29a provides a brake pressure debooster action in the brake without the use of pistons, or the like, external to the brake.

While the use of two sets of the annular pistons 17 through 26 is preferred, in some instances only one set may be used in combination with conventional brake means on the opposite side of the stack of brake discs 9 and 10. It also should be realized that any suitable flexible sealing member, which even may be a part of a sealed, flexible liquid receiving bag, may engage the axially outer ends of the pistons for transmitting pressure thereto or for backing up such pistons to let them be in axially offset relation for brake disc engaging action.

It should also be realized that any desired number of nested, annular brake pistons can be used in the apparatus of the invention and that the number shown in the present specification is for disclosure purposes only and represents one practical approach to the number of individual pistons that can be provided in a normal brake installation.

It should also be understood that other types of pistons could be used in the brake of the invention for the deboost action on the pressure. Thus a solid piston having comparable areas to the gasket 31a could be slidably received in the recess 116 in the front plate.

The present brake is believed to be made from a minimum number of moving parts and it provides equalized wear and braking conditions around all areas of the brake. The brake 1 also automatically at least partially compensates for any distortion of the back plate 7, or front plate 8 and aids in maintaining more uniform brake wear and brake action conditions over a long service life of the brake. Thus it is thought that the objects of the invention have been achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In a brake construction having a housing including fixed face and back plates with a stack of annular brake discs positioned therebetween, an annular piston-advancing cylinder formed in each of said face and back plates and open axially toward the discs, a nested set of annular pistons fitted in each piston-advancing cylinder in contiguous concentric relation to one another and together closing the open end of the cylinder, said pistons being independently movable axial of said brake discs into direct engagement with the flanking discs of the stack to distribute braking pressure over the entire face of the brake discs regardless of non-uniform wear of the disc, and means for supplying brake operating pressure to said piston-advancing cylinders collectively to jointly advance said pistons into direct individual engagement with the flanking discs of said stack over substantially their entire radial extent.

2. In a brake construction having a housing including fixed face and back plates with a stack of annular brake discs positioned therebetween, an annular piston-advancing cylinder formed in each of said face and back plates and open axially toward the discs, a nested set of annular pistons fitted in each piston-advancing cylinder in contiguous concentric relation to one another and together closing the open end of the cylinder, said pistons being independently movable axial of said brake discs into direct engagement with the flanking discs of the stack, a resilient sealing gasket in each of said piston-advancing cylinders in engagement with the posterior faces of each of said nested pistons for sealing the joints between the pistons of the set and between the set and the cylinder and distributing pressure to said pistons, and means for supplying brake operating pressure to said piston-advancing cylinders collectively to jointly advance said pistons into direct individual engagement with the flanking discs of said stack over substantially their entire radial extent.

3. In a brake construction having a housing including fixed face and back plates with a stack of annular brake discs positioned therebetween, an annular piston-advancing cylinder formed in each of said face and back plates and open axially toward the discs, a nested set of annular pistons fitted in each piston-advancing cylinder in contiguous concentric relation to one another and closing the open end of the cylinder, said pistons being independently movable axial of said brake discs into direct engagement with the flanking discs of the stack, a fluid-pressure receiving chamber formed in said face plate in continuation of its piston-advancing cylinder, a resilient sealing diaphragm between said receiving chamber and the adjacent cylinder, a passage connecting said piston-advancing cylinders, a resilient sealing diaphragm in each of said piston-advancing cylinders in engagement with the posterior faces of said nested pistons therein for distributing pressure to said pistons, and means for supplying brake operating pressure to said annular cylinders collectively to jointly advance said pistons into direct individual engagement with the flanking discs of said stack over their entire radial extent, said last-named means comprising a fluid-connecting fitting to said piston-advancing cylinders for supplying a fluid thereto, a viscous fluid filling said cylinders and trapped therein, and a fluid pressure supply to said chamber for supplying fluid pressure to the viscous fluid in said piston-advancing cylinders through the resilient sealing diaphragm therebetween.

4. In a brake construction having a housing including fixed face and back plates with a stack of annular brake discs positioned therebetween, an annular piston-advancing cylinder formed in each of said face and back plates and open axially toward the discs, a nested set of annular pistons fitted in each piston-advancing cylinder in contiguous concentric relation to one another and closing the open end of the cylinder, said pistons being independently movable axial of said brake discs into direct engagement with the flanking discs of the stack, an annular pressure debooster cylinder formed in said face plate in continuation of said piston advancing cylinder therein and of less radial dimension, a resilient sealing diaphragm between said debooster cylinder and said piston-advancing cylinder, a passage connecting said piston-advancing cylinders, a resilient sealing diaphragm in each of said piston-advancing cylinders in engagement with the posterior faces of said nested pistons therein for distributing pressure to said pistons, and means for supplying brake operating pressure to said annular cylinders collectively to jointly advance said pistons into direct individual engagement with the flanking discs of said stack over their entire radial extent, said last-named means comprising a fluid connecting fitting to said piston-advancing cylinders for supplying a fluid thereto, a viscous fluid filling said cylinders and trapped therein, and a fluid pressure supply to said debooster cylinder for supplying fluid pressure to the viscous fluid in said piston-advancing cylinders through the resilient sealing diaphragm therebetween.

References Cited in the file of this patent

UNITED STATES PATENTS

| | | |
|---|---|---|
| 1,165,400 | Dreisbach | Dec. 28, 1915 |
| 2,386,477 | Kraft | Oct. 9, 1945 |
| 2,616,262 | Driscoll | Nov. 4, 1952 |
| 2,626,021 | McAlpine | Jan. 20, 1953 |
| 2,888,103 | Armstrong | May 26, 1959 |

FOREIGN PATENTS

| | | |
|---|---|---|
| 628,948 | Great Britain | Sept. 8, 1949 |